United States Patent [19]

Brown et al.

[11] Patent Number: 4,490,313
[45] Date of Patent: Dec. 25, 1984

[54] CAPSULE MANUFACTURE

[75] Inventors: Robert W. Brown; Richard P. Bowman, both of Appleton, Wis.

[73] Assignee: Appleton Papers Inc., Appleton, Wis.

[21] Appl. No.: 460,704

[22] Filed: Jan. 24, 1983

[51] Int. Cl.$^3$ ............................................. B01J 13/02
[52] U.S. Cl. ................................ 264/4.7; 428/402.21
[58] Field of Search .................... 264/4.7; 428/402.21

[56] References Cited

U.S. PATENT DOCUMENTS

| 4,001,140 | 1/1977 | Foris et al. | 264/4.7 X |
| 4,087,376 | 5/1978 | Foris et al. | 264/4.7 X |
| 4,089,802 | 5/1978 | Foris et al. | 264/4.7 X |
| 4,100,103 | 7/1978 | Foris et al. | 428/320.6 X |
| 4,353,809 | 10/1982 | Hoshi et al. | 264/4.7 |
| 4,409,156 | 10/1983 | Hoshi et al. | 428/402.21 X |

FOREIGN PATENT DOCUMENTS 0070528 1/1983 European Pat. Off.
2277621 2/1976 France.
2062570 5/1981 United Kingdom.

*Primary Examiner*—Richard D. Lovering
*Attorney, Agent, or Firm*—E. Frank McKinney; Paul S. Phillips, Jr.

[57] ABSTRACT

A process is disclosed for performing encapsulation, en masse, by an in situ polymerization reaction to yield capsule wall material. The reaction comprises the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, in an aqueous vehicle and the reaction is conducted in the presence of mixtures of poly-electrolyte material, esp. poly(acrylic acid), and polystyrene sulfonic acid and/or salts thereof in certain critical proportions. The disclosed encapsulation process provides improved resistance of the emulsion of intended capsule core material to destabilization and permits the manufacture of micro-capsules with improved drop size distribution.

12 Claims, No Drawings

CAPSULE MANUFACTURE

This invention relates to a process for manufacturing minute capsules, en masse, in a liquid manufacturing vehicle. The process of the invention involves liquid-liquid phase separation of a relatively concentrated solution of polymeric material to be used in the formation of walls for the minute capsules. More particularly, the process of this invention involves the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, in an aqueous vehicle and the reaction is conducted in the presence of mixtures of polyelectrolyte material and polystyrene sulfonic acid and/or salts thereof.

A method of encapsulating by in situ polymerization, including a reaction between urea and formaldehyde or polycondensation of monomeric or low molecular weight polymers of dimethylol urea or methylated dimethylol urea in an aqueous vehicle conducted in the presence of negatively-charged, carboxyl-substituted, linear aliphatic hydrocarbon polyelectrolyte material dissolved in the vehicle, is disclosed in U.S. Pat. Nos. 4,001,140, 4,087,376 and 4,089,802.

A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted linear aliphatic hydrocarbon polyelectrolyte material dissolved in the vehicle, is disclosed in U.S. Pat. No. 4,100,103.

British Pat. No. 2,062,570, published May 28, 1981, discloses a process for producing microcapsules having walls produced by polymerization of melamine and formaldehyde in the presence of a styrenesulfonic acid polymer which becomes incorporated in the system. Other anionic high molecular electrolytes, such as polyacrylic acid, are disclosed for use in possible combination with the styrenesulfonic acid polymer. This same disclosure teaches that the styrenesulfonic acid polymer is present as 67–100% by weight of the mixture of the styrene sulfonic acid polymer and the anionic high molecular electrolyte.

The most widespread use of microcapsules to date has been in certain kinds of pressure-sensitive copying systems. In one such system, disclosed in U.S. Pat. No. 2,730,456 and commonly known as manifold record material, an upper sheet is coated on its lower surface with microcapsules containing a solution of a colorless chromogenic material, and a lower sheet is coated on its upper surface with a color developing coreactant material, e.g. an acidic clay, a phenolic resin or certain organic salts. For applications which require more than two plies in the record material, a number of intermediate sheets are also provided, each of which is coated on its lower surface with microcapsules and on its upper surface with acidic material. Pressure exerted on the sheets by writing or typing ruptures the microcapsules, thereby releasing the chromogenic material solution on to the co-reactant material on the next lower sheet and giving rise to a chemical reaction which develops the color of the chromogenic material.

In another such system, known as a self-contained system and disclosed in U.S. Pat. Nos. 2,730,457 and 4,197,346, microcapsules, containing a chromogenic material solution, and a co-reactant material are coated on the same surface of a sheet of paper. Pressure exerted on the sheet by writing or typing causes the capsules to rupture and release the chromogenic material, which then reacts with the co-reactant material on the sheet to produce a color.

Microcapsules for use in the above-described pressure-sensitive copying systems have a series of stringent property requirements so as to produce an optimum copying system. Some of these properties are capsule strength, size distribution range and wall integrity (impermeability).

The processes according to U.S. Pat. Nos. 4,001,140, 4,087,376, 4,089,802 and 4,100,103 have been successfully used to encapsulate solutions of chromogenic materials for use in pressure sensitive copying papers. Of the eligible carboxyl group system modifiers disclosed in said patents, the hydrolyzed maleic anhydride copolymers are preferred. Among the hydrolyzed maleic anhydride copolymers disclosed, the most preferred is poly(ethylene-co-maleic anhydride) (hereinafter referred to as EMA) because of the balance of properties provided to the encapsulation processes.

The cost of EMA has recently been rising rapidly, producing a consequent rise in the cost of the microcapsules manufactured by processes in which EMA constitutes the system modifier. Because of cost and availability considerations, poly(acrylic acid) (hereinafter referred to as PAA), is a logical substitute for EMA as the system modifier. While microcapsules made from processes according to U.S. Pat. Nos. 4,001,140 and 4,100,103, in which PAA constitutes the system modifier, are of commercial quality for use in pressure-sensitive copying paper, they do not possess the optimum balance of properties obtained when EMA is utilized.

One function of the system modifier in said patents is to take an active part in the control or moderation of the polymerization reaction of the starting materials used to form the condensation polymer which makes up the resulting capsule walls.

Another function of the system modifier in said patents is to act as an emulsifying agent to promote and maintain the separation of the individual droplets of the intended capsule core material in the aqueous manufacturing vehicle. When PAA is utilized as the system modifier, emulsification of the intended capsule core material requires more energy input and time and produces a poorer drop size distribution than when EMA is employed. The poorer emulsifying power of PAA can be offset in the case of the process of U.S. Pat. No. 4,100,103 by mixing in, prior to emulsification, the starting materials (e.g. methylated methylol melamine) employed in the in situ polymerization reaction to form the condensation polymer which makes up the resulting capsule walls. The presence of methylated methylol melamine or a low molecular weight polymer thereof, (hereinafter referred to as MMM) during the intended core material emulsification step can result in the premature polymerization of the MMM. This tendency of the MMM to prematurely react under these circumstances is reduced by raising the pH of the PAA-MMM solution to the highest level at which emulsification of the intended core material can be obtained. Once a satisfactory intended core material emulsion is obtained, the pH of the emulsion must be reduced in order to obtain the deposition of satisfactory capsule walls in a reasonable amount of time. This process has been further improved by the addition of certain salts as disclosed in copending application Ser. No. 370,323, now U.S. Pat. No. 4,444,699, of Donald E. Hayford.

It has now been learned that when the processes of U.S. Pat. Nos. 4,001,140, 4,087,376, 4,089,802 and 4,100,103 are practiced using PAA as the system modifier in combination with polystyrene sulfonic acid or a salt thereof (hereinafter referred to as PSA) in which the amount of PSA is about 6% to about 50% by weight of the PAA/PSA mixture, unexpected benefits are produced. Improved emulsification of intended capsule core material and an unexpected resistance of said emulsion to destabilization due to the presence of aminoplast precondensate intended capsule wall materials are two of the principal benefits. Additionally, the completed microcapsule slurries possess lower viscosities which has benefit in transferring and coating said slurries. The minimum required amount of PSA is based upon the presence of sufficient PSA to provide the improved emulsification. Above the maximum preferred amount of PSA, the resistance of the emulsion to destabilization is unacceptably lowered.

It is, therefore, an object of the present invention to provide a capsule manufacturing process wherein emulsion of intended capsule core material of improved drop size distribution is produced.

It is another object of the present invention to provide a capsule manufacturing process wherein the emulsion of intended capsule core material possesses improved resistance to destabilization resulting from the addition of aminoplast precondensate intended capsule wall materials to the manufacturing system.

It is a specific object of this invention to provide an encapsulating process wherein the capsule wall material comprises a urea-formaldehyde polymeric material or a melamine-formaldehyde polymeric material generated by an in situ polymerization reaction in the presence of a negatively-charged, carboxyl-substituted polyelectrolyte material and polystyrene sulfonic acid and/or sodium salts thereof dissolved in the manufacturing vehicle.

These and other objects and advantages of the present invention will become more apparent to those skilled in the art from a consideration of the following specification and claims.

The starting materials used to form the condensation polymer which makes up the resulting capsule walls and the procedures described in U.S. Pat. Nos. 4,001,140, 4,087,376, 4,089,802 and 4,100,103, which are hereby incorporated by reference, are eligible for use in the present invention. As indicated in U.S. Pat. No. 4,001,140, the encapsulating system should include from about 0.75 percent to about 10 percent of the system modifier. In addition to the materials and procedures described in the abovereferenced patents, the process of the present invention involves the use of poly(acrylic acid) (PAA) as the system modifier in combination with polystyrene sulfonic acid and/or sodium salts thereof (PSA) in a certain relative amount range. This combination is made prior to completion of the polycondensation of the starting material used to form the condensation polymer which makes up the resulting capsule wall. It has been found that the specific useful range of amounts of the mixture PAA and PSA is that in which the amount of PSA is about 6% to about 50% by weight of the PAA/PSA mixture. More preferred is about 20% to about 40% by weight PSA of the PAA/PSA mixture. Most preferred is about 30% by weight PSA of the PAA/PSA mixture.

The process is operable over a wide range of temperatures but a temperature range of about 40° C. to about 95° C. is preferred. More preferred is the temperature range of about 50° C. to about 70° C.

Under certain circumstances the inclusion of one of the salts disclosed in copending application Ser. No. 370,323 now U.S. Pat. No. 4,444,699, of Donald E. Hayford (supra) provides a further improvement in the wall integrity of the resulting microcapsule. However, the use of such salts is not required to practice and demonstrate the beneficial properties of the claimed invention.

The following examples are given merely as illustrative of the present invention and are not to be considered as limiting. All parts and percentages throughout the application are by weight, unless specified otherwise. All solutions, unless otherwise designated, are aqueous solutions.

The intended capsule core material for all of the examples to follow was a solution of chromogenic compounds as listed in Table I or Table II.

TABLE I

| Concentration | Chromogenic Material |
| --- | --- |
| 1.7% | 3,3-bis(p-dimethylaminophenyl)-6-dimethylaminophthalide |
| 0.55% | 2'-anilino-3'-methyl-6'-diethylaminofluoran |
| 0.55% | 3,3-bis(1-ethyl-2-methylindol-3-yl)phthalide |

The solvent for the preceding chromogenic compound solution was a mixture of 65 parts of a $C_{10}$–$C_{13}$ alkylbenzene and 35 parts of benzylated xylenes (U.S. Pat. No. 4,130,299).

TABLE II

| Concentration | Chromogenic Material |
| --- | --- |
| 1.0% | 3,3-bis(p-dimethylaminophenyl)1-6-dimethylaminophthalide |
| 1.0% | Pyridyl Blue (U.S. Pat. No. 4,275,905, Column 2, lines 62–66) |
| 0.6% | 3,3-bis(1-ethyl-2-methylindol-3-yl)phthalide |

The solvent for the above chromogenic compound solution was a mixture of 80 parts of a $C_{10}$–$C_{13}$ alkylbenzene and 20 parts of sec-butylbiphenyl (U.S. Pat. No. 4,287,074).

EXAMPLE 1

In this Example a solution made of the following components was adjusted to pH 4.0 with a 20% sodium hydroxide solution.

28 grams PAA ("Acrysol A-3", 25% solids; molecular weight less than 150,000; Rohm and Haas Co.)

10 grams PSA ("Versa-TL 71", 30% solids; polystyrene sulfonic acid; molecular weight 70,000; National Starch and Chemical Corp.)

212 grams water

Into 200 grams of the above solution were emulsified 180 grams of the chromogenic compound solution of Table I to yield a drop size range of about 15 microns and less. To the remaining portion of the PAA/PSA solution were added 25 grams of a partially methylated methylol melamine resin ("Resimene 714", 80% solids, Monsanto Company) and this mixture was in turn added with stirring to the above-described emulsion. The resulting mixture was placed in a container which was mounted in a room temperature water bath, continuous stirring was provided and the bath was heated to 65° C. and maintained at this temperature for about two hours to initiate and complete encapsulation. Encapsulation was successfully completed in this time as indicated by the CF draw-down test as described at Column 8, lines 53–61, and Column 10, lines 39–41, of U.S. Pat. No. 4,100,103.

EXAMPLE 2

A solution was made of the following components:
20.0 grams PAA ("Acrysol A-3", 25% solids)
16.7 grams PSA ("Versa-TL 71", 30% solids)
213.0 grams water This solution was then used to make microcapsules as in the procedure of Example 1. Although there was a slight amount of drop growth which resulted from the addition of the Resimene 714, the observed drop size range both before and after the addition of the melamine resin could be described as about 15 microns and less.

EXAMPLE 3

Two solutions were made as follows:

Solution A 30 grams PAA ("Acrysol A-3", 25% solids)
170 grams water

Solution B 1.67 grams PSA ("Versa-TL 71", 30% solids)
3.33 grams water

Each of the solutions was adjusted to pH 4.0 with a 20% sodium hydroxide solution. Into 150 grams of Solution A were emulsified 180 grams of the chromogenic compound solution of Table I and Solution B was added incrementally during the emulsification process step. 25 grams of "Resimene 714", 80% solids, were mixed with the remainder of Solution A and the mixture added to the emulsion. During the addition of the Resimene, a slight amount of growth of the emulsion drop size was observed. However, the amount of growth which occurred was not sufficient to adversely affect the performance of the resulting microcapsules in pressure-sensitive copying systems. The emulsion was placed with stirring in a water bath maintained at 55° C. and capsule wall formation occurred between 30 and 45 minutes as indicated by the CF draw-down test.

EXAMPLE 4

The procedure of Example 1 was repeated except that the pH of the initial PAA/PSA solution was adjusted with triethanolamine and 24 grams methylated methylol melamine resin (Cymel 382, an 82% solids resin solution produced by American Cyanamid Co.) were employed as the starting material for capsule formation. Capsule wall formation was essentially complete within 2 hours as indicated by the CF draw-down test.

EXAMPLE 5

A solution was made of the following components:
32 grams PAA ("Acrysol A-3", 25% solids)
40 grams PSA ("Versa-TL 400", 5% solids; sodium salt of polystyrene sulfonic acid; molecular weight 500,000; National Starch and Chemical Corp.)
178 grams water The procedure of Example 1 was repeated using the above solution and the chromogenic compound solution of Table II to successfully produce capsules as indicated by the CF draw-down test.

EXAMPLE 6

A solution was made of the following components:
36 grams PAA ("Acrysol A-1", 25% solids; molecular weight less than 50,000; Rohm and Haas Co.)
3 grams PSA ("Versa-TL 71", 30% solids)
161 grams water The procedure of Example 1 was repeated using 150 grams of the above solution and 180 grams of the chromogenic compound solution of Table II for the emulsification step to successfully produce capsules as indicated by the CF draw-down test.

EXAMPLE 7

A solution was made of the following components:
28 grams PAA ("Acrysol A-5", 25% solids; molecular weight less than 300,000; Rohm and Haas Co.)
10 grams PSA ("Versa-TL 71", 30% solids)
212 grams water The procedure of Example 1 was repeated using the chromogenic compound solution of Table II and a water bath temperature of 55° C. to successfully produce capsules as indicated by the CF draw-down test.

EXAMPLE 8

A solution was made of the following components:
28 grams PAA ("Acrysol A-3", 25% solids)
10 grams PSA ("Versa-TL 121", 30% solids; polystyrene sulfonic acid; molecular weight 120,000; National Starch and Chemical Corp.)
212 grams water The procedure of Example 1 was repeated using the above solution and a water bath temperature of 65° C. to successfully produce capsules in one hour as determined by the CF draw-down test.

EXAMPLE 9

A solution was made of the following components:
28 grams PAA ("Acrysol A-3", 25% solids)
10 grams PSA ("Versa-TL 71", 30% solids)
212 grams water
10 grams urea
1 gram resorcinol The pH of the solution was adjusted to 3.5 with a 20% sodium hydroxide solution and into the adjusted solution were emulsified 180 grams of the chromogenic compound solution of Table I to yield a drop size range of about 15 microns and less. To the emulsion were added 27 grams of 37% formaldehyde and the resulting mixture was placed in a container which was mounted in a water bath maintained at 55° C., continuous stirring was provided and the stirring and heating were maintained for 17 hours to complete the encapsulation process.

In order to further or alternatively test the integrity of the microcapsule walls formed, some of the examples of the invention were formulated into CB coatings substantially as described in U.S. Pat. No. 4,100,103, column 7, lines 21–39. These CB coatings were imaged in a Typewriter Intensity Test (U.S. Pat. No. 4,100,103, column 7, lines 40-58) and subjected to the Oven Storage Test (U.S. Pat. No. 4,100,103, column 7, line 59-column 8, line 11). The results of these tests, presented in Table III, indicate good capsule quality in all examples tested.

TABLE III

| CB Sheet Made from Capsules of Example | CB Storage in 100° C. Oven | | |
|---|---|---|---|
| | Storage Time | ITI | TI after Storage |
| 1 | 1 day | 56 | 57 |
| 2 | 1 day | 53 | 57 |
| 2 duplicate | 1 day | 53 | 58 |
| 3 | 3 days | 53 | 57 |
| 4 | 16 hours | 51 | 54 |
| 8 | 16 hours | 55 | 59 |
| 9 | 17 hours | 59 | 60 |
| 9 duplicate | 1 day | 59 | 61 |

COMPARATIVE EXAMPLES

Four examples within the scope of the polystyrene sulfonic acid amount limitations of British Pat. No. 2,062,570 were prepared.

EXAMPLE 10A

A solution made of the following components was adjusted to pH 4.0 with a 20% sodium hydroxide solution.
12.0 grams PAA ("Acrysol A-1", 25% solids)
25.0 grams PSA ("Versa-TL 71", 30% solids)
263.5 grams water Into 200 grams of the above solution were emulsified 180 grams of the chromogenic compound solution of Table II to yield a drop size range of about 15 microns and less. To the remaining portion of the PAA/PSA solution were added 25 grams of partially methylated methylol melamine, Resimene 714, 80% solids. The addition of Resimene 714 caused a substantial growth of the oil drop size of the emulsion of the chromogenic compound solution. The resulting mixture was placed in a container which was mounted in a water bath maintained at 55° C., stirring was provided and the mixture was maintained at this temperature with stirring to initiate and complete encapsulation. The resulting capsule slurry had a substantially larger size than is desirable due to the emulsion oil drop growth encountered.

EXAMPLE 10B

A solution made of the following components was adjusted to pH 4.0 with a 20% sodium hydroxide solution.
8.0 grams PAA ("Acrysol A-3", 25% solids)
26.7 grams PSA ("Versa-TL 71", 30% solids)
215.3 grams water Into 200 grams of the above solution were emulsified 180 grams of the chromogenic compound solution of Table I to yield a drop size range of about 15 microns and less. To the remaining portion of the PAA/PSA solution were added 25 grams of Resimene 714, 80% solids. The addition of this mixture to the above-described emulsion caused very substantial growth of the oil drop size of the emulsion. Because the oil drop size range after Resimene addition was about 30 microns and less, the process was discontinued.

EXAMPLE 10C

A solution made of the following components was adjusted to pH 4.0 with a 20% sodium hydroxide solution.
2.0 grams PAA ("Acrysol A-3", 25% solids)
31.7 grams PSA ("Versa-TL 71", 30% solids)
216.3 grams water The procedure of Example 10B was repeated using the above solution. The step of adding the solution containing the Resimene 714 to the emulsion caused the emulsion to break into two layers and, therefore, the process was discontinued.

EXAMPLE 10D

A solution made of the following components was adjusted to pH 4.0 with a 20% sodium hydroxide solution.
33.3 grams PSA (Versa TL-71, 30% solids)
266.7 grams water Into 200 grams of the above solution were emulsified 180 grams of the chromogenic compound solution of Table II to yield a drop size range of about 15 microns and less. To the remaining portion of the PSA solution were added 25 grams of partially methylated methylol melamine, Resimene 714, 80% solids. This mixture, when added to the above-described emulsion, caused extreme drop growth, with formation of free oil. The process was discontinued.

EXAMPLE 10E

A solution made of the following components was adjusted to pH 4.0 with a 20% sodium hydroxide solution.
33.3 grams PSA ("Versa-TL 71", 30% solids)
266.7 grams water To this solution were added 25.0 grams methylated methylol melamine (Resimene 714, 80% solids).

Into the above solution an attempt was made to emulsify 180 grams of the chromogenic compound solution of Table II. A stable emulsion could not be prepared, and, therefore, the process was discontinued.

Thus, comparative examples 10A-E, containing, respectively, 71%, 80%, 95%, 100% and 100% PSA by weight of the PAA/PSA mixtures, all within the range taught in British Pat. No. 2,062,570, because of emulsion instability either failed to produce capsules of acceptably small size or failed to produce capsules at all. The proportions of the claimed invention are critical to the properties of the novel process.

In order to compare the effect on the ability to obtain a satisfactory oil drop size resulting from the use of a PAA/PSA mixture in the preferred range of PSA concentration with the use of PAA alone, the following experiments were performed.

EXAMPLE 11A

The procedure of Example 1 was repeated and the parameters of the emulsification stages in the blender were determined as follows:

| Steps | Total time at stage | RPM of emulsification blender | Microscopically observed oil drop size |
|---|---|---|---|
| Emulsification stage 1 | 3 Min. | 4000 | About 35 microns and |

-continued

| Steps | Total time at stage | RPM of emulsification blender | Microscopically observed oil drop size |
|---|---|---|---|
| Emulsification stage 2 | 3 Min. | 5000 | About 20 microns and smaller. |
| Emulsification stage 3 | 3 Min | 6000 | About 15 microns and smaller. |
| Addition of Resimene 714 | — | — | About 15 microns and smaller. |

EXAMPLE 11B

The procedure of Example 1 was repeated with the exception that the following solution was used in place of the PAA/PSA mixture.
40.0 grams PAA ("Acrysol A-3", 25% solids)
210.0 grams water
The parameters of the emulsification stages in the blender were determined as follows:

| Steps | Total time at stage | RPM of emulsification blender | Microscopically observed oil drop size |
|---|---|---|---|
| Emulsification stage 1 | 3 Min. | 4000 | About 60 microns and smaller. |
| Emulsification stage 2 | 3 Min. | 5000 | About 25 microns and smaller. |
| Emulsification stage 3 | 3 Min. | 6000 | About 60 microns and smaller. |
| Emulsification stage 4 | 3 Min. | 6800 | About 25 microns and smaller. Many small drops. |
| Emulsification stage 5 | 3 Min. | 7500 | About 25 microns and smaller. Many small drops. |
| Addition of Resimene 714 | — | — | About 35 microns and smaller. |

The procedure using PAA alone requires a longer emulsification time, shows a poorer drop size distribution, shows an inability to yield the preferred smaller oil drop size range and shows substantial oil drop growth upon the addition of aminoplast precondensate intended capsule wall materials.

The invention being thus described, it will be obvious that the same may be varied in many ways. Such variations are not to be regarded as a departure from the spirit and scope of the invention and all such modifications are intended to be included within the scope of the following claims.

We claim:

1. A process for preparing microcapsules in an aqueous manufacturing vehicle which comprises enwrapping particles of intended capsule core material, substantially insoluble in said vehicle, with polymeric shells produced by in situ polymerization of melamine and formaldehyde, methylol melamine, methylated methylol melamine, urea and formaldehyde, dimethylol urea or methylated dimethylol urea in the presence of a mixture of poly(acrylic acid) and polystyrene sulfonic acid or a salt thereof, wherein said mixture is present as about 0.75 to about 10 percent, by weight, of the aqueous maufacturing vehicle and said polystyrene sulfonic acid or salt is present in an amount of about 6 to about 50 percent by weight based on the weight of said mixture.

2. The process of claim 1 wherein the polymeric shell is produced by in situ polymerization of methylated methylol melamine or urea and formaldehyde.

3. The process of claim 1 wherein the polymeric shell is produced by in situ polymerization of methylated methylol melamine.

4. The process of claims 1, 2 or 3 wherein the amount of polystyrene sulfonic acid or salt is about 20 to about 40 percent.

5. The process of claim 4 wherein the amount of polystyrene sulfonic acid or salt is about 30 percent.

6. The process of claim 4 wherein the polymerization is conducted at a temperature of about 40° C. to about 95° C.

7. The process of claim 6 wherein the polymerization is conducted at a temperature of about 50° C. to about 70° C.

8. A process for preparing microcapsules in an aqueous manufacturing vehicle which comprises enwrapping particles of intended capsule core material, substantially insoluble in said vehicle, with in situ polymerized methylated methylol melamine in the presence of a mixture of poly(acrylic acid) and polystyrene sulfonic acid, wherein said mixture is present as about 0.75 to about 10 percent, by weight, of the aqueous manufacturing vehicle and said polystyrene sulfonic acid is present in an amount of about 6 to about 50 percent by weight based on the weight of said mixture.

9. The process of claim 8 wherein the amount of polystyrene sulfonic acid is about 20 to about 40 percent.

10. The process of claim 9 wherein the amount of polystyrene sulfonic acid is about 30 percent.

11. The process of claims 8, 9 or 10 wherein the polymerization is conducted at a temperature of about 40° C. to about 95° C.

12. The process of claim 11 wherein the polymerization is conducted at a temperature of about 50° C. to about 70° C.

* * * * *